United States Patent
Sakai

(10) Patent No.: US 6,694,088 B1
(45) Date of Patent: Feb. 17, 2004

(54) PROGRESSIVE SCAN VIDEO PRODUCTION SYSTEM AND MAGNETIC RECORDING/ REPRODUCING APPARATUS

(75) Inventor: Akihira Sakai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/326,024

(22) Filed: Jun. 4, 1999

(30) Foreign Application Priority Data

Jun. 4, 1998 (JP) ............................................ 10-155527

(51) Int. Cl.[7] .............................. H04N 5/93; H04N 5/95
(52) U.S. Cl. ............................... 386/52; 386/65; 386/85
(58) Field of Search ............................... 386/46, 52, 65, 386/66, 85

(56) References Cited

U.S. PATENT DOCUMENTS 6,526,216 B1 * 2/2003 Morimoto et al. ............. 386/52

FOREIGN PATENT DOCUMENTS

WO   WO98/44728   8/1998

* cited by examiner

Primary Examiner—Huy Nguyen
(74) Attorney, Agent, or Firm—RatnerPrestia

(57) ABSTRACT

In a progressive scan video production system with no 30 Hz information dealing with progressive scan TV signals, phase of time code signals of 30 Hz and video signals of the progressive scan TV system is locked. Two VTRs of the progressive scan TV system are connected by a single coaxial cable, and progressive scan video signals are transmitted in a serial digital interlace format. In the second VTR, using time code signals multiplexed to serial digital interface signals, information corresponding 1/30 second is detected, field information is generated, video signals and time code signals are phase locked for recording and reproducing.

5 Claims, 6 Drawing Sheets

PROGRESSIVE SCAN VIDEO PRODUCTION SYSTEM AND MAGNETIC RECORDING/REPRODUCING APPARATUS

FIELD OF THE INVENTION

The present invention relates to a progressive scan video production system and magnetic recording/reproducing apparatus which conduct management of the positioning of video material at a half of the frame frequency during transmission or editing of video signals between component apparatuses of the system.

BACKGROUND OF THE INVENTION

Conventionally, position management and phase lock for video material between the component apparatuses of a video production system of NTSC system have been carried out at 30 Hz. This is because NTSC employs the interlace scan system and its frame frequency is 30 Hz, of which information is integrated in NTSC system. There has been a problem in introducing the progressive scan video system in the NTSC market. The frame frequency of a progressive scan video signal is 60 Hz and not 30 Hz. Therefore, unless an appropriate method is proposed, all the related apparatuses would have to be replaced with progressive scan video signal compatible apparatuses in order to introduce this system. One of such proposed methods is described as a conventional example hereinafter.

FIG. 3 is a block diagram of a configuration of a conventional progressive scan video production system.

The example comprises a recording/reproducing apparatus 1 (hereinafter, VTR) based on the progressive scan TV system, a VTR 20 based on the progressive scan TV system, and an interlace TV sync signal source 5.

In editing a video material, the VTR 1 is used as a reproduction apparatus and the VTR 20 is used as a recording apparatus.

The interlace TV sync signal source 5 outputs interlace reference signals (hereinafter, I_REF), a reference for the management of the frame position and the like of the system. I_REF is a 30 Hz signal synchronizing with an interlace sync signal. Apparatuses other than the interlace TV sync signal source 5, namely the progressive scan VTR 1 and VTR 20, have a I_REF input terminal 1a and a I_REF input terminal 20a provided respectively thereon.

Timing of each apparatus is controlled according to the I_REF, thereby synchronizing the whole system.

A video output terminal 1e of the VTR 1 and a video input terminal 20b of the VTR 20 are connected. During the editing of video material, the video signals recorded on the VTR 1 are input into the VTR 20 via the video output terminal 1e and the video input terminal 20b. The video signals are multiplexed with audio signal and supplementary data such as time code signal. The VTR 20 separates the audio signal and the supplementary data such as time code signal from the multiplexed signal, and re-records a new time code on a tape in the VTR 20 while simultaneously recording the video signals.

In the time code, frame data including time (hour, minute, second) and frame numbers which show the position of the frame are included to be used for positioning the video material during editing or reproduction.

The interlace TV sync signal source 5 supplies I_REF to the I_REF input terminal 1a of the VTR 1 and the I_REF input terminal 20a of the VTR 20. When the video material is edited or reproduced, VTR 1 and VTR 20 are phase locked at 30 Hz according to the I_REF. Besides VTR 1 and VTR 20, needless to say, other peripherals are also controlled at 30 Hz through receiving the frequency of 30 Hz from the I_REF.

Following is a brief description of the progressive scan TV system. (Refer to the broadcasting standard SMPTE292M, SMPTE296M and SMPTE293M for details.)

SMPTE293M (720×483 Active Line at 59. 94 Hz Progressive Scan Production Digital Representation) is a signal format generally called 525P which is a promising system as a progressive scan TV system with 525 lines. 525P has 525 lines in 1/60 seconds among which 483 lines are effective, and one vertical period or 1/60 seconds forms one frame.

Therefore, there is no information showing bounds of 1/30 seconds in 525P.

SMPTE296M (1280×720 Scanning, Analog and Digital Representation and Analog Interface) is a signal format generally known as 720P. This is a promising system for a progressive scan TV for high definition TV or HDTV. In 720P, there are 750 lines in 1/60 seconds among which 720 lines are effective. One vertical period or 1/60 seconds forms one frame. Therefore, there is no information indicating bounds at 1/30 seconds in 720P either.

On the other hand, SMPTE292M (Bit-Serial Digital Interface for High Definition Television Systems) is a transmission format called Bit-Serial Digital Interface (hereinafter, SDI) of Y luminance signals and Pb/Pr color-difference signals. SDI can transmit video signals, audio signals and time code signals via single coaxial cable. The progressive scan video signals in the SMPTE296M or SMPTE293M format can be transmitted as digital serial signals by using SDI.

In the progressive scan video production system, there is a common problem in dealing with video signals in both 525P and 720P format. The problem is described below taking 720P as an example.

FIG. 5 and FIG. 6 are abstracts of SMPTE296M. FIGS. 5 and 6 show analog signals and digital signals in the 720P format respectively. They all are progressive scan TV signals.

FIG. 5 shows analog signals in the 720P format. As FIG. 5 shows, the top line of the analog video signal is line 26, the bottom line is line 745, blanking line is from line 746 through line 750 and line 1 through line 25. This format consists of progressive scan video signals with 750 lines in total. There is no information for 1/30 seconds or 30 Hz.

FIG. 6 shows digital video signals of 720P. As shown in FIG. 6, in the case of 720P digital signals, the Line Start and the Line End of video signals are controlled by the Start Active Video (SAV) and the End Active Video (EAV). The Top Line and Bottom Line are recognizable through SAV and EAV.

This format consists of progressive scan video signals totaling 750 lines, however, there is no information for 1/30 seconds or 30 Hz.

In contrast to progress sequence scan TV signals in the 720P format, the format of the interlace TV signals forms one frame with a frequency of 1/30 seconds in two fields, the first and second fields with a frequency of 1/60 seconds. Moreover, in the interlace TV signal format, the sync signal format of the first and second fields is different, and there is information for discriminating the first field and the second field.

However, as described above, the progressive sequence scan TV signal format as set forth in FIGS. 5 and 6 does not form fields, therefore there is no information corresponding to 1/30 seconds or 30 Hz.

Therefore, in order to introduce the progressive scan video production system into a video production system of which the system is controlled based on information of 1/30 seconds, the interlace TV sync signal source 5 which generates information corresponding to 30 Hz (I_REF) had to be included.

FIG. 4 shows a block diagram describing the progressive scan VTR 20 as set forth in FIG. 3 in further detail.

Following is the description of FIG. 4.

When video is recorded, recording/reproducing (REC/PB) switches 14 and 17 are connected to the recording (REC) side. The progressive scan video signal input from the video input terminal 20b is recorded on a tape 25 by a rotary head 12 after passing through a recording amplifier 8 and the REC/PB switch 14.

A recorded frame detecting circuit 7 detects the starting point of each frame of progressive scan video signals.

On the other hand, I_REF input from the I_REF input terminal 20a is input into a reproduction frame detecting circuit 11. The reproducing frame detecting circuit 11 generates frame reset signals of 30 Hz and outputs the frame reset signals to the recorded frame detecting circuit 7. The recorded frame detecting circuit 7 resets signals detected from the video input signals which indicate each starting point responding to the frame reset signals, and outputs frame lock signals of 30 Hz to a servo circuit 13. The servo circuit 13 then drives a tape driving motor 26 based on the frame lock signals output from the frame detector 7, and controls running speed of the tape 25. The VTR 20 phase locks the record of the signals.

In this manner, the transmission of the progressive scan video signals from the VTR 1 to VTR 20 can be managed at 30 Hz.

During reproduction, the REC/PB switches 14 and 17 are connected to the PB side. The progressive scan video signals reproduced by the rotary head 12 is output from a video output terminal 20e via the REC/PB switch 14 and a reproduction amplifier 9. The servo circuit 13 drives the tape driving motor 26 according to the frame lock signals output from the reproduction frame detecting circuit 11, and controls running of the tape 25 while the VTR 20 outputs the video signals controlled at 30 Hz.

As it is clearly shown in the above description of the operation, in order to record and reproduce progressive scan video signals in the system controlled at 30 Hz, an apparatus which outputs 30 Hz signals and a cable which transmits such 30 Hz signals are desirable.

SUMMARY OF THE INVENTION

The progressive scan video production system and magnetic recording/reproducing apparatus of the present invention comprise a plurality of video apparatuses including at least one recording/reproducing apparatus based on the progressive scan TV system which alternatively transmits progressive scan video signals including at least video signals, audio signals and time code signals, wherein said recording/reproducing apparatus comprises; detecting means for detecting time code signals; signal generating means for generating signals with a half of a frame frequency by detecting a frame position of one of odd and even frame numbers included in the detected time code; and controlling means for controlling phase-sync of frames based on the generated signals with the half of the frame frequency.

With the above configuration, information corresponding to the frequency which is the half of the frame frequency, for example 30 Hz, is generated out of the time code multiplexed to progressive scan video signals. Based on this information, relative relationship between the video signals and location on the tape where the video signals are to be recorded is locked and re-recorded.

Therefore, the progressive scan video production system can be incorporated into the interlace scan video production system without employing an interlace TV sync signal source.

The connection between progressive scan VTRs functioning as a recording apparatus and a reproducing apparatus respectively is simplified, and the out put from the progressive scan VTR functioning as a recording apparatus can be directly routed into the interlace scan video production system.

DESCRIPTION OF THE PREFERRED EMBODIMENTS

A progressive scan video production system of the preferred embodiment of the present invention is described hereinafter with reference to the accompanying drawings.

Figure 1:
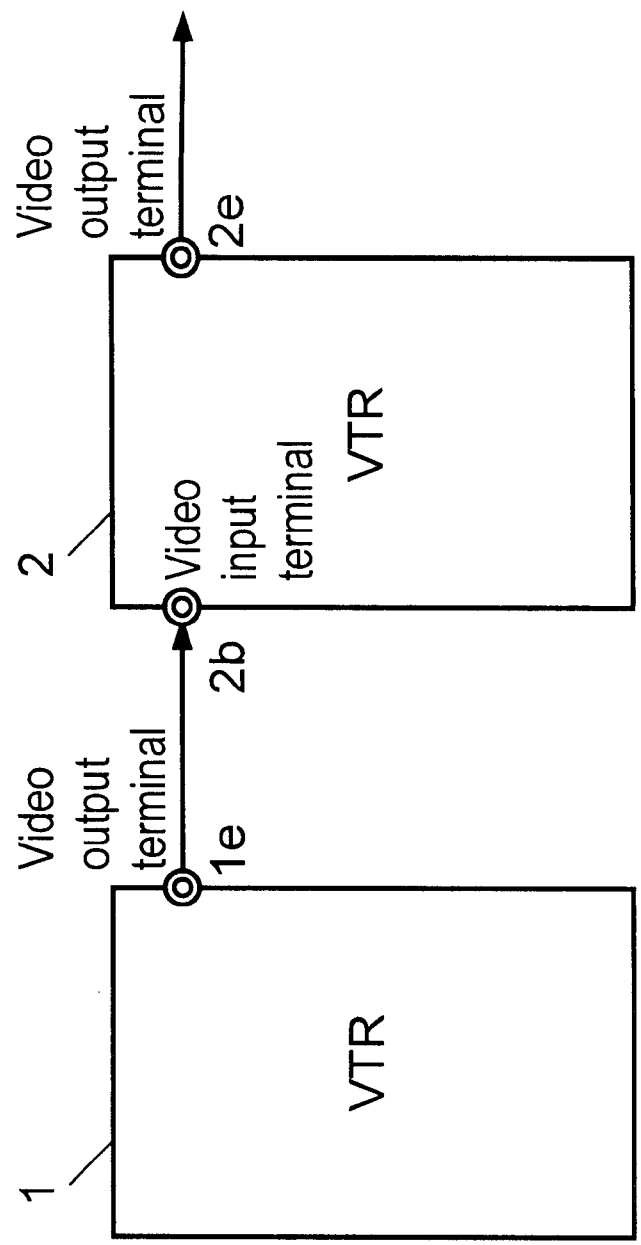
FIG. 1 shows a block diagram illustrating the configuration of the progressive scan video production system in accordance with a preferred embodiment of the present invention.

In FIG. 1 a progressive scan recording/reproducing apparatus (hereinafter, VTR) 1 is used as a reproducing apparatus and, a progressive scan VTR 2 is used as a recording apparatus.

SMPTE292M is a transmission format called Bit-Serial Digital Interface (hereinafter, SDI) of Y luminance signals and Pb/Pr color difference signals. By using this format, TV signals including video signals, audio signals and time code signals can be transmitted via one single coaxial cable. In general, TV signals in the signal formats of SMPTE293M which stipulates a format called 525P for progressive scan video signals and SMPTE296M which stipulates a format known as 720P for the progressive scan video signals, can be transmitted as digital serial signals by SDI.

The transmission format of the progressive scan video signals to be described in the embodiment is preferably SMPTE292M or related transmission formats, and signals are in the SDI format.

A video output terminal 1e of the VTR 1 and a video input terminal 2b of the VTR 2 are connected by a coaxial cable. The reproducing apparatus VTR 1 contains a tape on which video signals in the SDI format are recorded, and transmits the video signals in the SDI format to the VTR 2 via the coaxial cable while the VTR 2 re-records the video signals. When the VTR 2 reproduces and outputs video signals, VTR 2 outputs the video signals from the video output terminal 2e. The VTR 1 and 2 are connected by this single coaxial cable.

According to the present invention, by simply making a connection with a single coaxial cable, the sync control (sync lock) at 30 Hz between apparatuses becomes possible. The video signals output from the VTR 2 can be managed at 30 Hz from outside.

Figure 2:
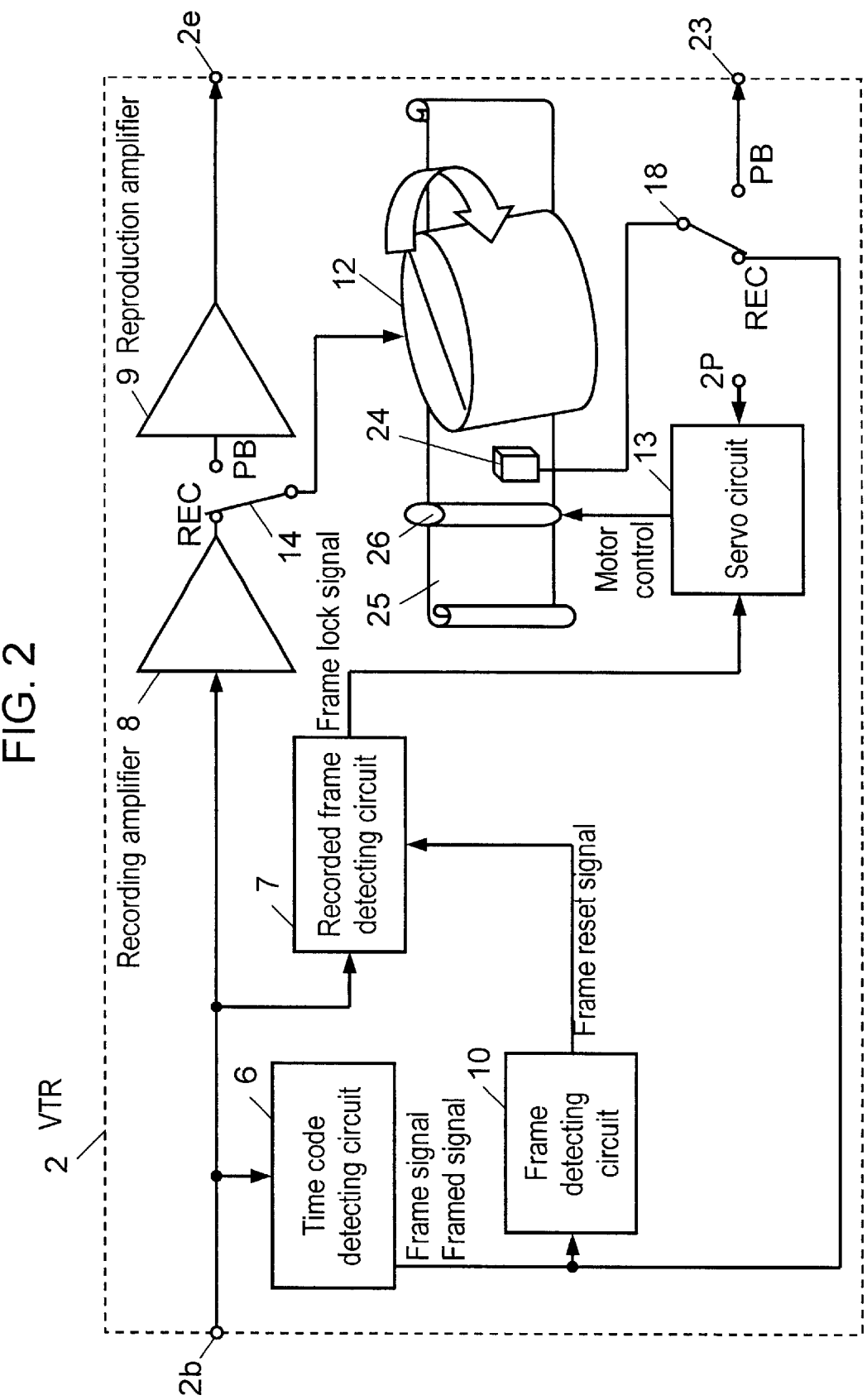
FIG. 2 shows a block diagram illustrating the operation of a VTR used as a reproducing apparatus in accordance with the preferred embodiment of the present invention.
Figure 3:
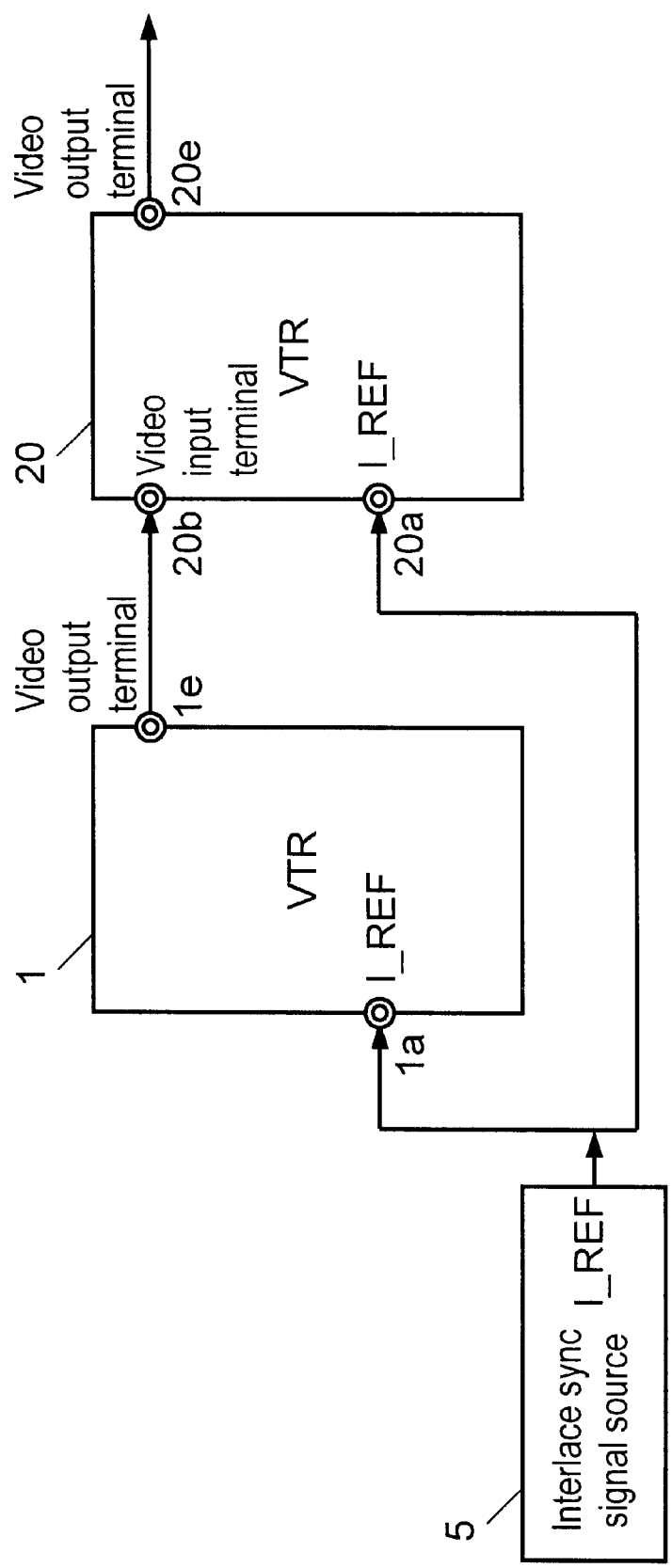
FIG. 3 shows a block diagram illustrating the configuration of the conventional progressive scan video production system.
Figure 4:
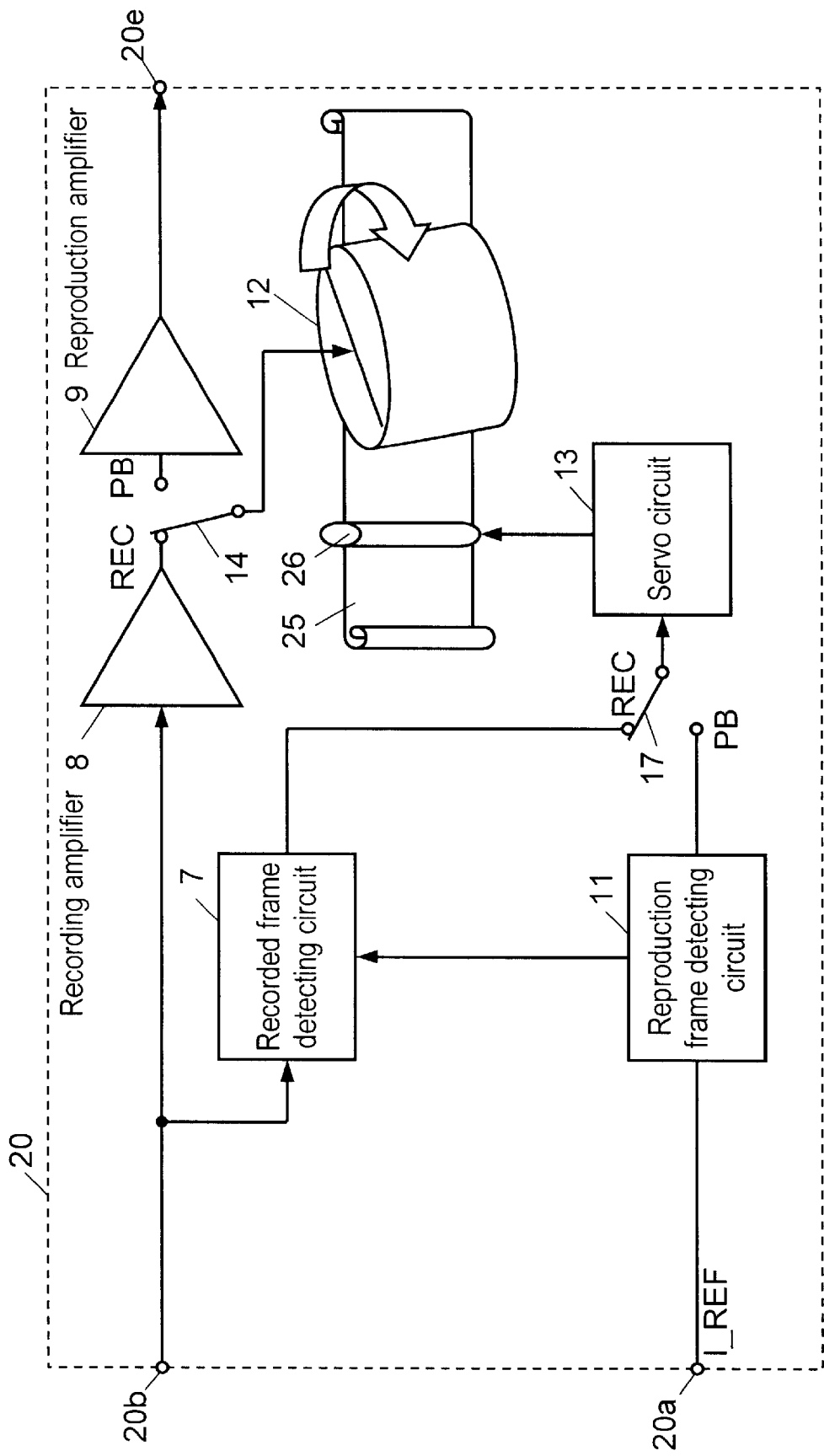
FIG. 4 shows a block diagram illustrating the operation of a VTR used as a reproducing apparatus in the prior art as set forth in FIG. 3.
Figure 5:
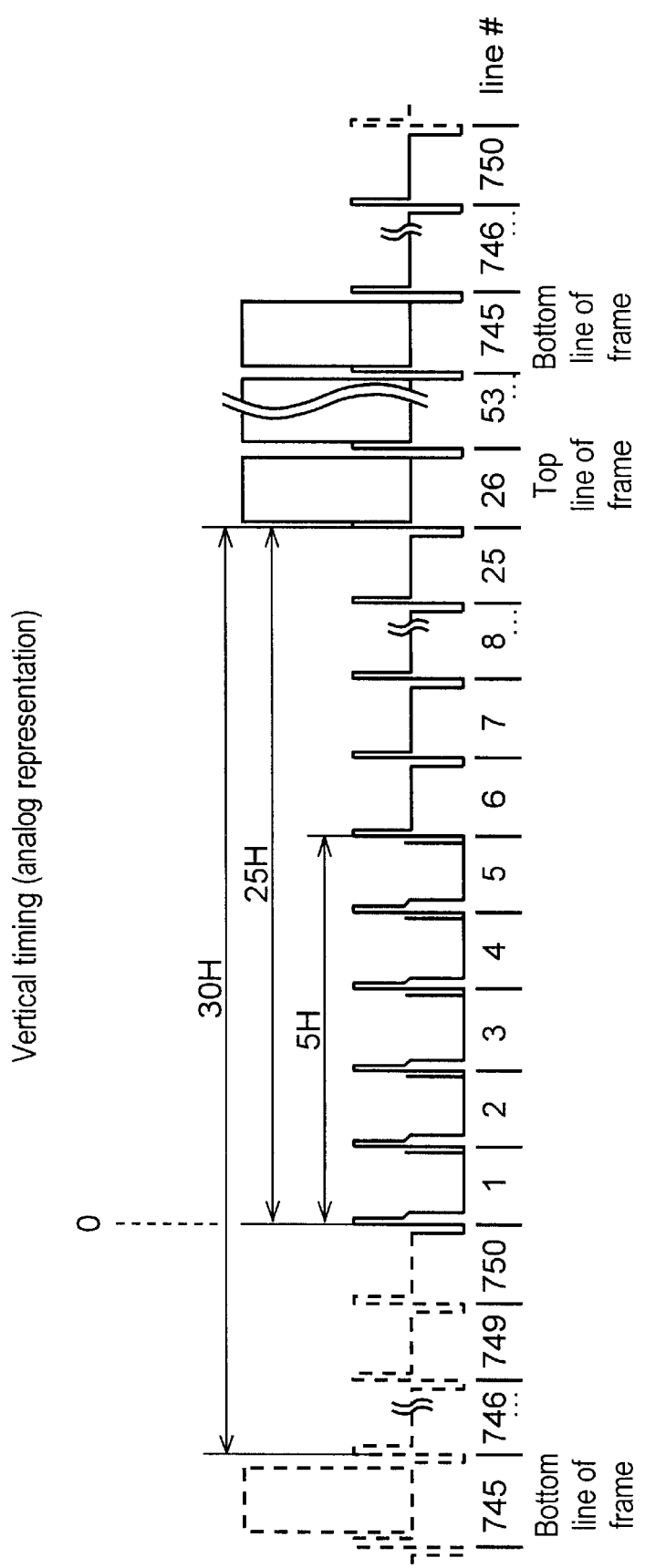
FIG. 5 shows analog signals of the 720P progressive scan video system.
Figure 6:
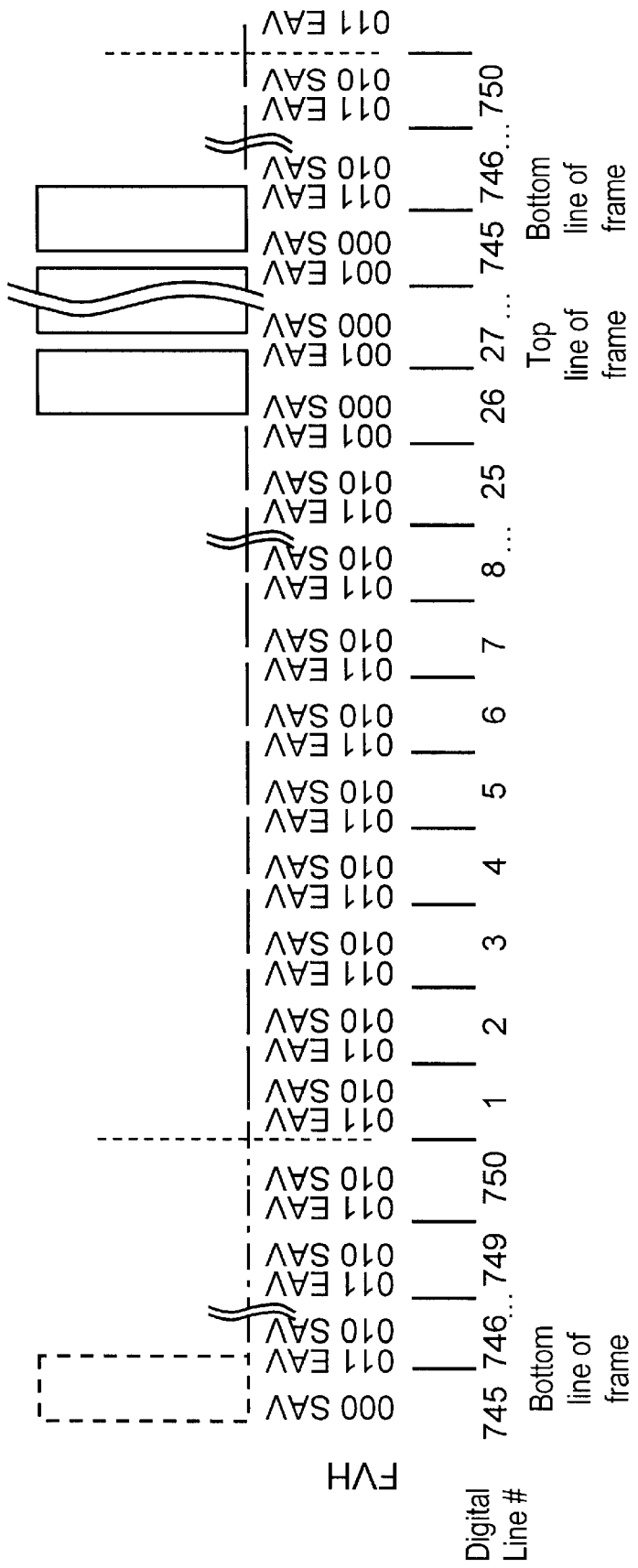
FIG. 6 shows digital signals of the 720P progressive scan video system.

Detailed description of the operation is given with reference to FIG. 2. FIG. 2 shows a block diagram illustrating further details of the progressive scan VTR 2 as set forth in FIG. 1.

First, the operation of the VTR 2 during recording is described.

In the recording mode, the REC/PB switch 14 and 18 are connected to the REC side. The progressive scan video signals input from the video input terminal 2b are recorded on the tape 25 by the rotary head 12 after being transmitted through the recording amplifier 8 and REC/PB switch 14.

The recorded frame detecting circuit 7 detects the starting point of each frame of the progressive scan video signals. The intervals between detected starting points are 1/60 seconds (repetition frequency is 60 Hz). A time code detecting circuit 6 detects time code signals multiplexed as supplementary data to the video signals in the SDI format input from the video signal input terminal 2b. The time code detecting circuit 6 generates frame signals with the frame frequency based on the detected time code signals and outputs the frame signals. Furthermore, the time code detecting circuit 6 discriminates between odd and even frame numbers included in the detected time code signals, and outputs signals (hereinafter, framed signals) correspondingly to frames with odd (or even) frame numbers. Accordingly, framed signals are output successively at every second frame of video signals in the SDI format. In other words, the framed signal is a signal of 30 Hz. As described above, the time code detecting circuit 6 outputs frame signals of 60 Hz and framed signals of 30 Hz. New time code based on the framed signals of 30 Hz output by the time code detecting circuit 6 is output to a time code head 24 via the REC/PB switch 18 and then recorded on the tape 25. The time code head 24 operates as a time code writer when recording and as a time code reader when reproducing.

A frame detecting circuit 10 inputs frame signals of 60 Hz output by the time code detecting circuit 6, divides their frequency into half and, based on the framed signals output by the time code detecting circuit 6, determines the phase of the signals with divided frequency. The frame detecting circuit 10 then outputs the signals of which frequency is divided to 30 Hz and phase is determined (hereinafter, frame reset signals) to the recorded frame detecting circuit 7.

The recorded frame detecting circuit 7, responding to the frame reset signals, resets signals detected out of the video input signals, which indicate starting points of 60 Hz, generates frame lock signals of 30 Hz and outputs the signals to the servo circuit 13. The servo circuit 13 then drives the tape driving motor 26 based on the frame lock signals of 30 Hz output from the recorded frame detecting circuit 7 and controls the running of the tape 25. Accordingly, the position of the rotary head 12 against the tape 25 and phase of the video signal input into the rotary head 12 are locked.

As described above, the video signals recorded in the tape 25 in the VTR 2 become signals of which position is managed by odd or even frame numbers of the SDI format video signals.

Next, the operation of the VTR 2 during reproduction is described. According to FIG. 1, the progressive scan VTR 2 is placed as a recording apparatus, however in general, it has a function as a reproducing apparatus as well. In the reproducing mode, REC/PB switches 14 and 18 are connected to the PB side.

In the reproducing mode, the progressive scan video signals reproduced out of the recorded tape 25 by the rotary head 12 is output to the video output terminal 2e via REC/PB switch 14 and reproduction amplifier 9.

During reproduction, the time code head 24 reads out time code recorded in the tape 25 by the time code head 24 during recording. The time code is then output from a TC output terminal 23 via REC/PB switch 18.

In reproduction, the servo circuit 13 drives the tape driving motor 26 and controls the tape 25 responding to signals 2p generated based on the signals output by the rotary head 12 and signals output by the time code head 24.

As it was described above, the video signals reproduced from the tape 25 in the VTR 2 become signals of which position is managed by a frame with odd or even frame number of video signals in the SDI format.

Although the embodiment has been so far described on the premise that signals are in the SDI format, the format for video signals is not limited to SDI system. The VTR 2 may convert signals in such a manner that frame positions can be managed at a frequency which is the half of the frame frequency (for example, 30 Hz) before outputting as other apparatuses of interlace scan system practice.

The phase lock of the system comprising two progressive scan video VTRs was explained, needless to say however, the same method can also be applied to a phase lock between other video editing apparatuses.

In the above description, frame frequency of the interlace scan video signals was set at 30 Hz and management of the frame position was conducted at 30 Hz. However, frame frequency of the interlace scan video signal can be 25 Hz, so can management of the frame position be conducted at 25 Hz as well. In short, if the frequency is the half of the frame frequency, it is applicable.

As it has been described, when video signals are transmitted or edited between component apparatuses of the system, the video material position can be managed at the half of the frame frequency. In other words, according to the present invention, a progressive scan video device not having half of the frame frequency (30 Hz) can be introduced into a video production system using signals with a frequency being the half of the frame frequency (30 Hz) provided by interlace sync signals for positioning video material when editing, copying and transmitting video signals.

Moreover, when transmitting progressive scan video signals from the VTR 1 to VTR 2, it is a significant advantage in the use of such apparatuses that only one single cable is needed to connect the two VTRs, especially when the two VTRs are located far from each other.

In the case of the interlace scan video signals, frame position management was successfully conducted at 30 Hz since the first field of the interlace sync signal format was discriminated from the second field of the same. The progressive scan video signals do not contain information of 30 Hz. However, the progressive scan video signals of the present invention can manage the frame position at 30 Hz, based on the result of the discrimination between odd and even frame numbers included in the time code transmitted with the image.

Reference Numerals 1, 2 progressive scan video system VTR
1a interlace reference signal input terminal
1e, 2e video output terminal
2b video input terminal
6 time code detecting circuit
7 recorded frame detecting circuit
8 recording amplifier
9 reproduction amplifier
10 frame detecting circuit
12 rotary head
13 servo circuit
14, 18 REC/PB switch
24 time code head
25 tape
26 tape driving motor

What is claimed is:

1. A progressive scan video production system comprising a plurality of video apparatuses including at least one progressive scan recording/reproducing apparatus which transmits progressive scan video signals including at least video signals, audio signals and time code signals said recording/reproducing apparatus comprising:
    detecting means for detecting time code signals included in a received progressive scan video signal;
    signal generating means for generating signals with a half of a frame frequency of said received progressive scan video signal by detecting frame positions of one of odd and even frame numbers included in the detected time code signals; and
    controlling means for controlling phase-sync of frames of said received progressive scan video signal based on the generated signals with the half of the frame frequency.

2. The progressive scan video production system as defined in claim 1 of which said progressive scan video signals are those specified by SMPTE292M, SMPTE296M or SMPTE293M.

3. The progressive scan video system as defined in claim 1, further comprising means for detecting a starting position of each frame of said received progressive scan video signal, wherein said progressive scan video production system determines a signal phase of the starting position based on the signals with said half of the frame frequency.

4. A magnetic recording/reproducing apparatus comprising:
    means for detecting time code signals included in a received progressive scan video signal;
    means for generating signals with a half of a frame frequency of said received progressive scan video signal by detecting frame positions of one of odd and even frame numbers included in the detected time code signals; and
    means for controlling the phase-sync of said received frames based on the generated signals with the half of the frame frequency.

5. A magnetic recording/reproducing apparatus as defined in claim 4, further comprising detecting means for detecting a starting position of each frame of said received progressive scan video signal wherein said progressive scan video production system determines a signal phase of the starting position based on the signals with said half of the generated frame frequency.

* * * * *